US011172266B2

(12) United States Patent
Mathur (10) Patent No.: US 11,172,266 B2
(45) Date of Patent: Nov. 9, 2021

(54) SYSTEM TO CORRECT CLOSED CAPTIONING DISPLAY USING CONTEXT FROM AUDIO/VIDEO

(71) Applicant: Sling Media, L.L.C., Foster City, CA (US)

(72) Inventor: Mudit Mathur, Milpitas, CA (US)

(73) Assignee: SLING MEDIA, L.L.C., Foster City, CA (US)

( * ) Notice: Subject to any disclaimer, the term of this patent is extended or adjusted under 35 U.S.C. 154(b) by 0 days.

(21) Appl. No.: 16/673,601

(22) Filed: Nov. 4, 2019

(65) Prior Publication Data

US 2021/0136459 A1  May 6, 2021

(51) Int. Cl.
| | |
|---|---|
| *H04N 21/488* | (2011.01) |
| *H04N 21/4728* | (2011.01) |
| *H04N 21/431* | (2011.01) |
| *G06K 9/00* | (2006.01) |
| *G06K 9/62* | (2006.01) |
| *G10L 15/26* | (2006.01) |
| *G10L 15/25* | (2013.01) |
| *G06F 40/51* | (2020.01) |

(52) U.S. Cl.
CPC ......... *H04N 21/4884* (2013.01); *G06F 40/51* (2020.01); *G06K 9/00744* (2013.01); *G06K 9/6256* (2013.01); *G10L 15/25* (2013.01); *G10L 15/26* (2013.01); *H04N 21/4316* (2013.01); *H04N 21/4728* (2013.01)

(58) Field of Classification Search
None
See application file for complete search history.

(56) References Cited

U.S. PATENT DOCUMENTS

| | | | | |
|---|---|---|---|---|
| 10,299,008 | B1* | 5/2019 | Catalano | H04N 21/4884 |
| 2008/0284910 | A1* | 11/2008 | Erskine | H04N 21/234336 |
| | | | | 348/468 |
| 2010/0332214 | A1* | 12/2010 | Shpalter | G06F 40/51 |
| | | | | 704/2 |
| 2011/0134321 | A1* | 6/2011 | Berry | G11B 27/322 |
| | | | | 348/464 |
| 2016/0014482 | A1* | 1/2016 | Chen | H04N 21/26258 |
| | | | | 386/241 |

\* cited by examiner

*Primary Examiner* — Omar S Parra
(74) *Attorney, Agent, or Firm* — Seed IP Law Group LLP (57) ABSTRACT

Embodiments are directed towards the analysis of the audio-visual content to adjust the timing, duration, or positioning of closed captioning so that the closed captioning more closely aligns with the scene being presented. Content that incudes video, audio, and closed captioning is obtained, and the audio is converted to text. A duration and timing for the closed captioning is determined based on a comparison between the closed captioning and the audio text. Scene context is determined for the content based on analysis of the video and the audio, such as by employing trained artificial neural networks. A display position of the closed captioning is determined based on the scene context. The duration and timing of the closed captioning are modified based on the scene context. The video and closed captioning are provided to a content receiver for presentation to a user based on the display position, duration, and timing.

20 Claims, 4 Drawing Sheets

SYSTEM TO CORRECT CLOSED CAPTIONING DISPLAY USING CONTEXT FROM AUDIO/VIDEO

TECHNICAL FIELD

The present disclosure relates generally to the presentation of audiovisual content, and more particularly, but not exclusively, to analyzing audio or video portions of content to modify the presentation of closed captioning.

BACKGROUND

Description of the Related Art

Audiovisual content often includes closed captioning for the hearing impaired, for use in noisy environments, for subtitles, or for other situations where viewers may want to read a text version of the audio. In some situations, the closed captioning displays words or symbols to the viewer that describe the audio being presented with the video. For example, if there is instrumental music playing, the closed captioning may include "(music playing)" or it may include one or two musical note symbols. In other situations, the closed captioning can also be used as subtitles, which can be in the same language as the audio or in some other language. Unfortunately, the information being presented through the closed captioning generally does not align with the corresponding audio or video. For example, in some situations the closed captioning may lag behind the audio. In other situations, the period in which the closed captioning is displayed may be too short or too long. It is with respect to these and other considerations that the embodiments herein have been made.

BRIEF SUMMARY

Briefly stated, embodiments are directed towards the analysis of the audiovisual content to adjust the timing or duration of the closed captioning so that the closed captioning more closely aligns with the scene being presented. Many times when closed captioning is added to content (e.g., as a separate data stream), the closed captioning generally does not properly align with the audio of the content.

For example, assume the content includes a person saying "the clouds are very white today, we need to go to the store" and the scene immediately jumps to an unrelated scene. In some situations, the displayed closed captioning of the same text may be removed with the changed scene. It is possible, however, that the closed captioning was not displayed long enough for the viewer to read all of the text before it was removed. In this case, the viewer may lose perspective on what is happening in the content.

As another example, if the person speaking is saying something in a first language, but the closed captioning is in a second language, the translated second language closed captioning may have a duration that is different from the duration of the person speaking in the first language. In this case, it may be beneficial to have the closed captioning displayed the entire time the person is speaking in the first language; otherwise, the viewer may wonder what other information is not being displayed in the closed captioning.

Moreover, the positioning of the closed captioning is often selected by a person or is positioned in a predetermined location. In some situations, however, the placement of the closed captioning makes it unclear who is speaking or it may cover other information or details being displayed.

Embodiments described herein improve the timing, duration, and position of the closed captioning. After content including video, audio, and closed captioning is obtained, the timing and duration of the closed captioning is determined based on a comparison between the closed captioning and a text version of the audio. A scene context is also determined based on an analysis of the video or audio of the content. A display position of the closed captioning may be determined based on the scene context, and the duration or the timing of the closed captioning may be modified based on the scene context. The video and the closed captioning are then provided to a content receiver for presentation to a user based on the determined display position, the modified duration, or the modified timing.

In some embodiments, determining the timing for the closed captioning may include: determining a start time for a first plurality of words in the closed captioning based on a timestamp associated with a first word of the first plurality of words; performing a word comparison between the audio text and the first plurality of words; in response to a match between a second plurality of words in the audio text and the first plurality of words in the closed captioning, determining an audio start time of the second plurality of words in the audio; and modifying the start time of the first plurality of words in the closed captioning to match the audio start time of the second plurality of words in the audio.

In other embodiments, determining the duration for the closed captioning may include: determining a start time and an end time for a first plurality of words in the closed captioning based on a timestamp associated with a first word of the first plurality of words; performing a word comparison between the audio text and a first plurality of words in the closed captioning; in response to a match between a second plurality of words in the audio text and the first plurality of words in the closed captioning, determining an audio duration of the second plurality of words in the audio; and modifying the duration of the first plurality of words in the closed captioning to match the audio duration of the second plurality of words in the audio. Determining the duration may also include: translating the audio text from a first language to a second language of the closed captioning; determining an audio duration of the audio text that corresponds to the closed captioning based on a comparison of the translated audio text and the closed captioning; and setting the duration for the closed captioning based on the audio duration.

Determining the scene context and determining the display position may include various embodiments. In some embodiments, a background area of a scene in the content is identified based on changes in the background area over a plurality of frames being below a threshold value; and the background area is selected as the display position in which to present the closed captioning. In other embodiments, a person that is speaking in a scene in the content is identified based on mouth movement of the person over a plurality of frames; a location of the person within the scene is determined; and the display position in which to present the closed captioning is selected to be adjacent to the location of the person speaking.

In various embodiments, one or more artificial neural networks may be employed to determine the scene context. In some embodiments, a plurality of training audio clips each having a training scene context is received; an artificial neural network is trained on the plurality of audio clips to generate classification probability parameters for each of the training scene context; and the trained artificial neural network is employed on the audio of the content to determine a probability of the scene context. In other embodiments, a plurality of training video clips each having a training scene context is received; an artificial neural network is trained on the plurality of video clips to generate classification probability parameters for each of the training scene context; and the trained artificial neural network is employed on the video of the content to determine a probability of the scene context.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, the drawings include.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
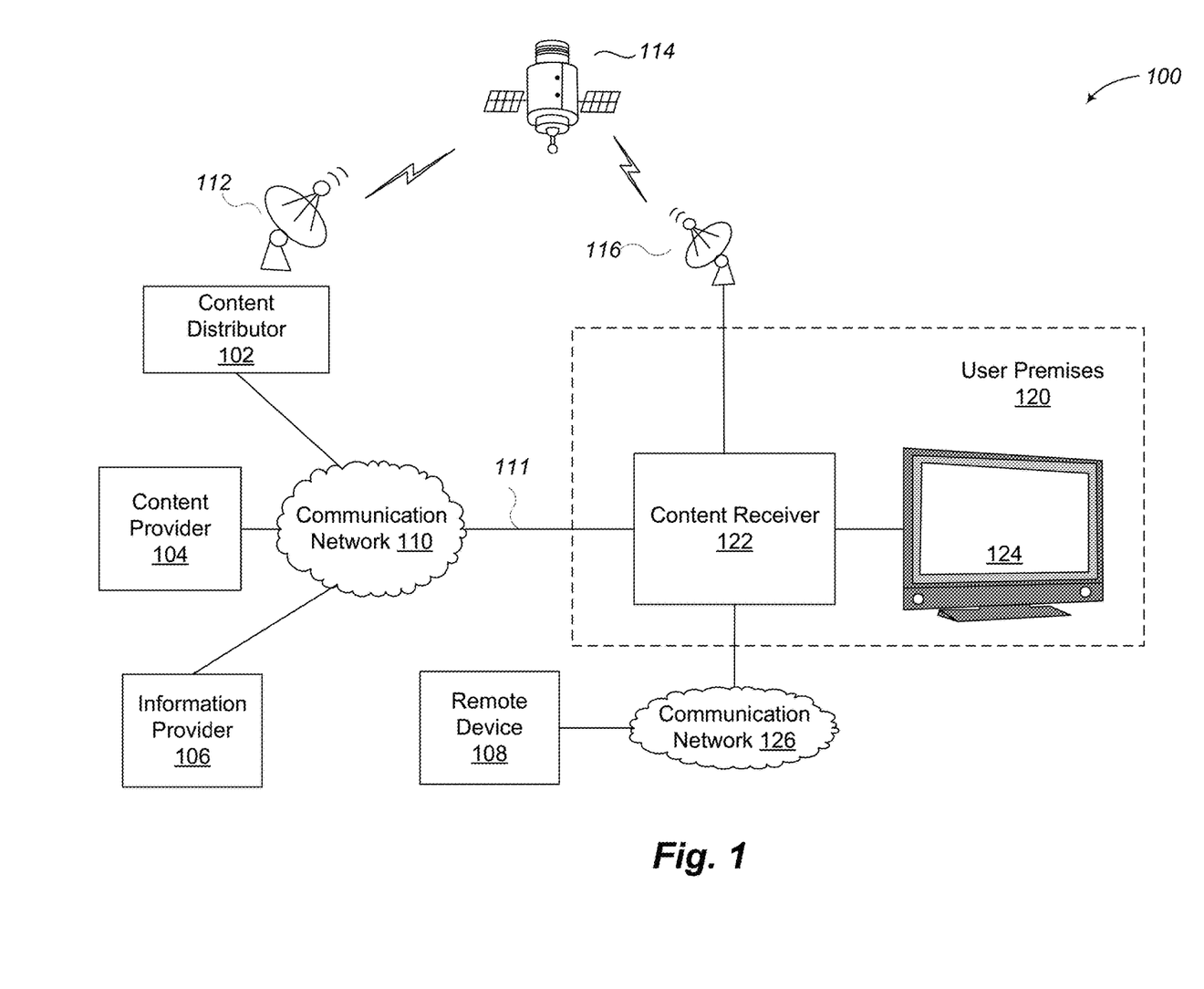
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 100 includes content provider 104, information provider 106, content distributor 102, communication networks 110, and user premises 120.

Typically, content providers 104 generate, aggregate, and/or otherwise provide audiovisual content that is provided to one or more users. Sometimes, content providers are referred to as "channels." Examples, of content providers 104 may include, but are not limited to, film studios; television studios; network broadcasting companies; independent content producers, such as AMC, HBO, Showtime, or the like; or other entities that provide content for user consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the program content provided by content provider 104. For example, this data may include, for example, metadata, program name, closed-caption authoring and placement within the program content, closed-caption start time, closed-caption content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together. In various embodiments, the combining of the program content with the other data may include modifying the timing, duration, or placement of the closed captioning as described herein.

In various embodiments, content providers 104 or information provider 106, or other entities, may add various additional information to the audiovisual content prior to its distribution to users. This additional information may include inserting or otherwise encapsulating metadata into the program content data stream of the content, generating a Timed Text data stream that is separate from the program-content data stream, etc. This resulting content can include the program content, metadata, Timed Text data, or other information.

Content distributor 102 may provide the content, whether obtained from content provider 104 and/or the data from information provider 106, to a user through a variety of different distribution mechanisms. For example, in some embodiments, content distributor 102 may provide the content and data to a user's content receiver 122 directly through communication network 110 on link 111. In other embodiments, the content may be sent through uplink 112, which goes to satellite 114 and back to downlink station 116 that may also include a head end (not shown). The content is then sent to an individual content receiver 122 of a user/customer at user premises 120.

Content distributor 102 receives content to be provided to content receiver 122 for display on display device 124. Content distributor 102 also receives closed captioning or subtitles associated with the content. The closed captioning is a textual or symbolic version of the audio component of the content. The closed captioning may be in the same language as the spoken language in the audio or it may be different. The closed captioning may include one or more presentation timestamps that indicate when in the presentation of the content to display the closed captioning. In some embodiments, the closed captioning may also include an end presentation timestamp or a duration to indicate how long to display the closed captioning. For example, the closed captioning may be "Now that the cat is fed" and "we can go to the park." Each of these separate phrases may include a presentation timestamp to indicate when to display the respective phrase and a duration to indicate how long to display the respective phrase.

The closed captioning may also include other information, such as where on the displayable content to present the closed captioning, such as lower left, across the bottom of the screen, etc. In various embodiments, the closed captioning position information may include a pixel location on the screen (e.g., an image frame) that represents a top left most pixel of the closed captioning. In other embodiments, other types of screen positioning information may also be utilized, e.g., utilizing a plurality of screen sectors or regions, a number of pixels from the bottom of the content image frame, etc.

Once the content distributor 102 has received the content and the closed captioning, or as they are being received (if received substantially in parallel), the content distributor 102 analyzes the audio component or the video component, or both, to identify one or more characteristics of the content. These characteristics are used to determine or modify the presentation timing of the closed captioning relative to the content, the duration of how long to present the closed captioning with the presentation of the content, the positioning on the closed captioning, or any combination thereof. The characteristics of the content may include, but are not limited to, a word for word comparison or matching between the closed captioning and the audio, scene context (e.g., what is happening in the scene, changes in the scene, etc.) determined from an analysis of the audio, scene context determined from an analysis of the video, genre of the content, expected or target audience of the content, etc.

In various embodiments, the content distributor 102 trains one or more artificial neural networks, or other artificial intelligence or machine learning techniques, to learn or generate classification probability parameters for identifying a scene context given a target audio or video content. In some embodiments, a plurality of training audio clips of training or determined scene context are used to train the artificial neural network. In other embodiments, a plurality of training video clips of training or determined scene context are used to train the artificial neural network.

After the artificial neural network is trained and content and closed captioning are received, the audio or video associated with the content may be analyzed by a corresponding artificial neural network to determine the scene context. For example, in some embodiments, the audio associated with the content is analyzed by an audio-trained artificial neural network to determine the scene context. In various embodiments, this analysis may be over a selected or predetermined number of seconds. In other embodiments, the video associated with the content can be analyzed by a video-trained artificial neural network to determine the scene context. In various embodiments, this analysis may be over a selected or predetermined number of image frames. For example for a given i-frame in the content, the next four i-frames may be analyzed with the artificial neural network to identify the scene context for the given i-frame. This analysis can be performed for every i-frame or periodically every x number of i-frames, where x is a selected or predetermined number of i-frames to skip before analyzing another i-frame for the scene context.

The scene context can identify how long a person in the scene is talking, which person in the scene is talking, a speed at which the person is talking, changes from one scene to another, a speed of the scene (e.g., a fast moving gun fight, a romantic table setting, etc.), etc., which may be determined or learned through the training of the artificial neural network.

Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Content receiver 122 may be a receiving device of the content from content distributor 102. Examples of content receiver 122 may include, but are not limited to, a set-top box, a cable connection box, a computer, or other content or content receiver s. Content receiver 122 may be configured to demultiplex the content and provide the program content and closed captioning or other information to a user's display device 124, such as a television, monitor, or other display device.

Although FIG. 1 illustrates the content receiver 122 providing content for display on a display device 124 located on the user premises 120, embodiments are not so limited. In some other embodiments, the content receiver 122 provides the content to a remote device 108, such as a mobile phone, smartphone, tablet, or other computing device, that is at a remote location to the user premises 120. The content receiver 122 may send content to the remove device 108 via communication network 126.

Communication network 126 may be configured to couple various computing devices to transmit data or content from one or more devices to one or more other devices, such as content receiver 122 sending notifications of a future program to remote device 108 and receiving recording instructions back from the remote device 108. In some embodiments, communication network 126 may be included in communication network 110. And in other embodiments, communication network 126 may be separate and/or distinct from communication network 110, and the networks may or may not have any direct communications between them. For example, communication network 110 may be the internet, and communication network 126 may be a personal area network via Bluetooth technology.

The operation of certain aspects will now be described with respect to FIGS. 2 and 3. In at least one of various embodiments, processes 200 and 300 described in conjunction with FIGS. 2 and 3, respectively, may be implemented by one or more processors or executed via circuitry on one or more computing devices, such as content distributor 102 or content receiver 122 in FIG. 1.

Figure 2:
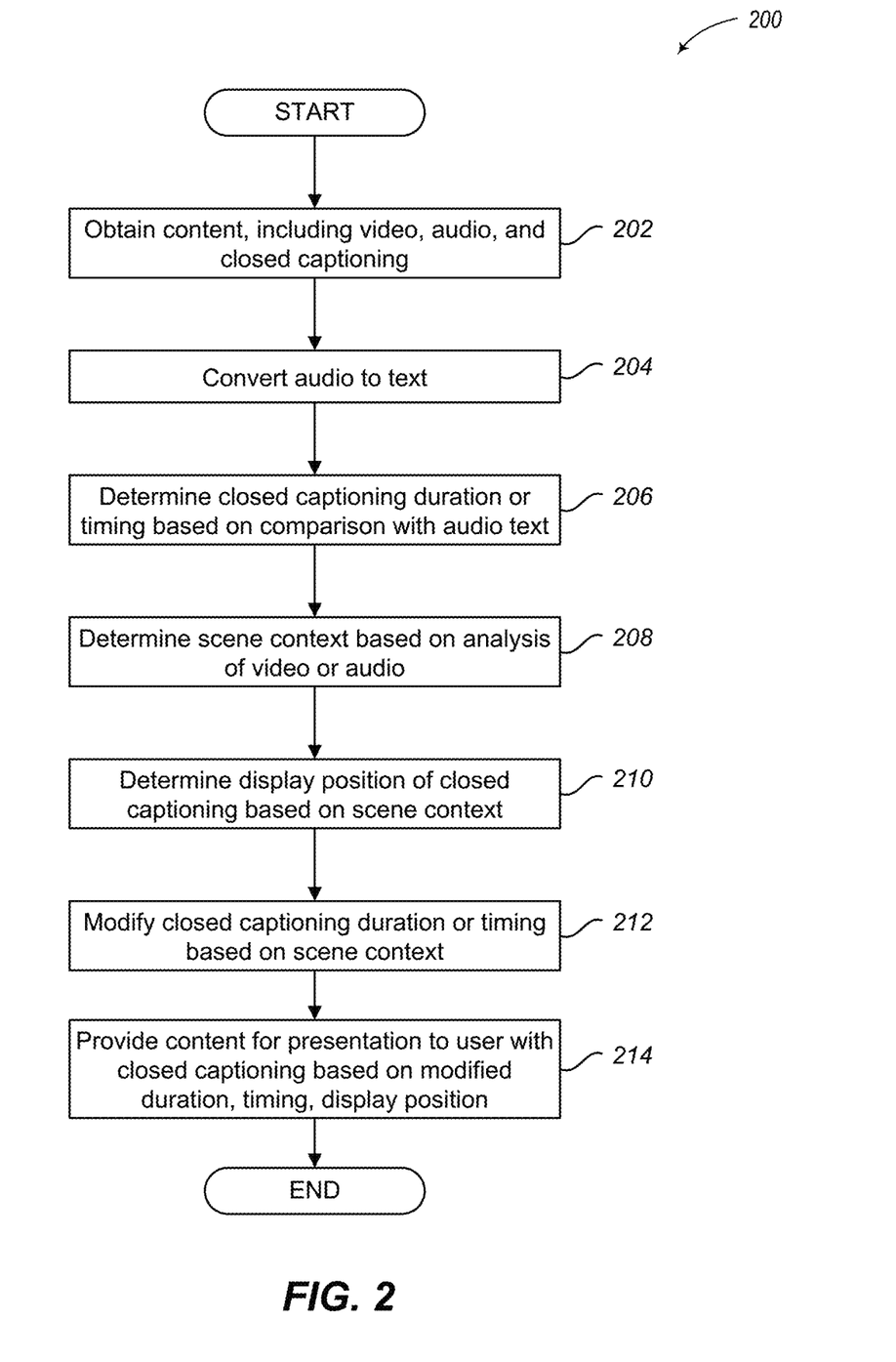
FIG. 2 illustrates a logical flow diagram generally showing one embodiment of an overview process for analyzing content to modify the closed captioning duration and timing in accordance with embodiments described herein.

FIG. 2 illustrates a logical flow diagram generally showing one embodiment of a process 200 for analyzing content to modify the closed captioning duration and timing in accordance with embodiments described herein. Process 200 begins, after a start block, at block 202, where content is obtained. The content includes a video component, an audio component, and a closed captioning component.

The video component includes a plurality of image frames that present a visual representation of a scene. In some embodiments, the plurality of image frames may comprise a plurality of i-frames and interspersed p-frames and b-frames. The audio component includes an audio stream associated with the video component. And the closed captioning is a text or symbolic representation of the audio stream. The closed captioning may be in the same or in a different language than the language spoken in the audio stream. In at least one embodiment, the closed captioning may also include or be referred to as subtitles.

In various embodiments, the closed captioning component includes a plurality of closed captioning portions. Each respective closed captioning portion may include a respective presentation timestamp that identifies when in the video to present the respective closed captioning portion. In at least one embodiment, each respective closed captioning portion also includes a respective duration, or end presentation timestamp, which indicates how long the respective closed captioning portion is to be presented with the video.

Process 200 proceeds to block 204, where the audio is converted to text. In some embodiments, one or more speech recognition techniques may be employed to convert the audio into readable text. In some embodiments, a window or portion of the audio may be selected based on presentation timestamp and the duration of the closed captioning. This selected audio portion may be converted to text for comparison with the closed captioning. If a language of the audio is different from the language of the closed captioning, then one or more language translation techniques may be utilized to convert the audio text into the same language as the closed captioning, or vice versa.

Process 200 continues at block 206, where the closed captioning duration or timing is determined based on a comparison with the audio text. As noted above, the closed captioning may include presentation timestamps. In some embodiments, the presentation timestamp of the closed captioning is compared to a time of when the corresponding audio text begins relative to the video. If there is a difference, then the presentation timestamp of the closed captioning may be modified or adjusted based on the time of when the audio text begins.

Similarly, the closed captioning may include duration. In some embodiments, the duration of the closed captioning is compared to a duration of the corresponding audio text. If there is a difference, then the duration of the closed captioning may be modified or adjusted based on the duration of the audio text.

Process 200 proceeds next to block 208, where a scene context of the content is determined based on an analysis of the video or audio, or both. In various embodiments, one or more artificial neural networks or other artificial intelligence or machine learning techniques may be employed, which is described in more detail below in conjunction with FIG. 3.

As mentioned above, the scene context can identify how long a person in the scene is talking, which person in the scene is talking, a speed at which the person is talking, changes from one scene to another, a speed of the scene (e.g., a fast moving gun fight, a romantic table setting, etc.), etc. In general, the scene context is a classification or categorization of what is going on in the scene that may affect timing or duration of the closed captioning.

In some embodiments, the scene context may be determined in a single pass of the content, such as if the content is live or streaming. In other embodiments, the scene context may be determined based on an analysis over multiple passes, which may include analyzing the content over different durations or numbers of frames, analyzing previous content, analysis future content, etc., or some combination thereof.

Process 200 continues next at block 210, where a display position of the closed captioning is determined based on the scene context. In various embodiments, the scene context may identify blank or solid portions of the displayed images. The display position of the closed captioning may be set to display the closed captioning in the blank or solid portion so as to not obscure other aspects of the displayed content. In other embodiments, the scene context may indicate that the person on the left of the screen is speaking. The display position of the closed captioning may be set to be on the left size of the screen adjacent to the person speaking.

In some embodiments, the display position may be selected based on a combined analysis of multiple scenes to not obscure, or to reduce an amount of obscurement of, other displayed information or details. For example, if the closed captioning is to be displayed on the left side of the screen because the person speaking is on the left, but the next scene includes a car approaching from the lower left, then the closed captioning may be displayed on the upper left to not obscure or distract from the approaching car. In at least one embodiment, such multi-scene analysis may be performed when the timing or duration of the closed captioning results in the closed captioning being displayed across multiple scenes. However, in other embodiments, multi-scene analysis may be performed to draw a viewer's attention to one portion of the screen or the other based on what is happing in a next scene.

In some embodiments, other characteristics of the closed captioning may also be modified based on the scene context or the display position. For example, if the scene context indicates that the scene includes a lot of dark colors, then the closed captioning may be displayed in white or some other light-colored text.

Process 200 proceeds to block 212, where the closed captioning duration or timing, or both are modified based on the scene context. In at least one embodiments, the scene context may indicate when a person's mouth begins to move and when it stops. The presentation timestamp of the closed captioning can be modified to align with the start of the mouth movement, and the duration of the closed captioning can be modified to last the same length of time the mouth is moving.

In other embodiments, the scene context may indicate a genre or overall mood of the scene, such as comedy, romantic, action, etc. In one example illustration, if the scene is a romantic scene, then the duration of the closed captioning may be increased; whereas if the scene is a fight scene, then the duration of the closed captioning base by decreased. These changes in the closed captioning can provide a more fulfilling and interactive experience for the viewer. In various embodiments, each separate scene context may include a determined increase or determined decrease in the duration of the closed captioning, which may be determined by the trained artificial neural networks. For example, the closed captioning duration of a fight scene may be aligned with the audio duration, but with a maximum increase of 6%. Conversely, the closed captioning duration of a sports scene may be aligned with the audio duration, but with a maximum increase of 2%. These examples are for illustrative purposes and other amounts of duration increases and decreases may also be utilized.

Process 200 continues at block 214, where the content is provided for presentation to a user with the closed captioning based on the modified duration, timing, and display position. In some embodiments, the content is provided to a content receiver (e.g., content receiver 122 in FIG. 1) to be displayed on a display device (e.g., display device 124 in FIG. 1). In at least one embodiment, other encoding, compression, or encryption techniques may be employed on the content prior to be provided to a content receiver. In other embodiments, the content is provided directly to the display device. In various embodiments, the user may select whether or not the closed captioning is displayed along with the video.

After block 214, process 200 terminates or otherwise returns to a calling process to perform other actions. Although process 200 is described and shown as a single flow, embodiments are not so limited. In some embodiments, process 200 may loop (not illustrated) from block 212 to block 202 for each separate content portion or closed captioning portion. In other embodiments, process 200 may loop (not illustrated) from block 214 to block 202 for sequential portions of content, e.g., as more content is obtained at block 202.

Figure 3:
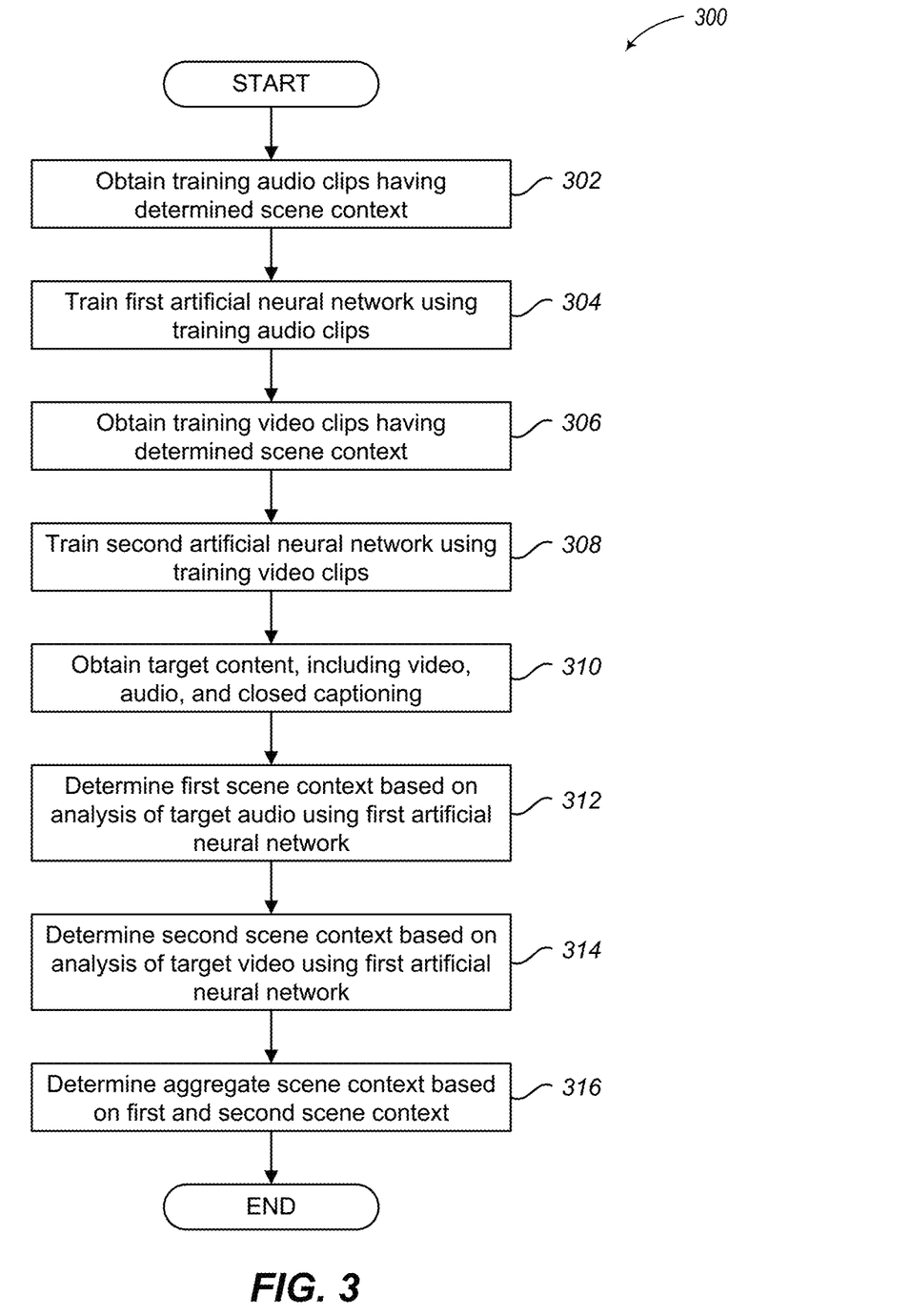
FIG. 3 illustrates a logical flow diagram generally showing one embodiment of a process for analyzing content to determine the scene context of the content in accordance with embodiments described herein.

FIG. 3 illustrates a logical flow diagram generally showing one embodiment of a process 300 for analyzing content to determine the scene context of the content in accordance with embodiments described herein. Process 300 begins, after a start block, at block 302, where a plurality of training audio clips are obtained. The plurality of training audio clips may be from a plurality of different movies, television programs, sports broadcasts, news broadcasts, comedy acts or shows, video music albums, or the like. Each of the plurality of training audio clips are tagged, labeled, or otherwise associated with a determined scene context. In some embodiments, a person may label each of the plurality of training audio clips with the determined scene context.

Process 300 proceeds to block 304, where a first artificial neural network is trained using the training audio clips. In various embodiments, one or more known training techniques may be employed to train the first artificial neural network using the training audio clips and their determined scene context. Embodiments are not limited to artificial neural networks and other machine learning techniques may be employed.

Process 300 continues at block 306, where a plurality of training video clips are obtained. The plurality of training video clips may be from a plurality of different movies, television programs, sports broadcasts, news broadcasts, comedy acts or shows, video music albums, or the like. The training video clips may be selected from the same set of content as the training audio clips or from a different set of content. Each of the plurality of training video clips are tagged, labeled, or otherwise associated with a determined scene context. In some embodiments, a person may label each of the plurality of training video clips with the determined scene context.

Process 300 proceeds next to block 308, where a second artificial neural network is trained using the training video clips. In various embodiments, one or more known training techniques may be employed to train the second artificial neural network using the training video clips and their determined scene context. Embodiments are not limited to artificial neural networks and other machine learning techniques may be employed. Training the first and second artificial neural networks may include similar training techniques or they may be different.

Process 300 continues next to block 310, where target content is obtained. In various embodiments, block 310 employs embodiments of block 202 in FIG. 2 to obtain content that includes video, audio, and closed captioning.

Process 300 proceeds to block 312, where a first scene context is determined based on an analysis of the target audio using the first artificial neural network. In various embodiments, employment of the first artificial neural network returns a projected scene context for the target audio and a given probability for that scene context being related to the target audio. In other embodiments, the first artificial neural network returns a plurality of projected scene contexts and their respective probabilities.

Process 300 continues at block 314, where a second scene context is determined based on an analysis of the target video using the second artificial neural network. In various embodiments, employment of the second artificial neural network returns a projected scene context for the target video and a given probability for that scene context being related to the target video. In other embodiments, the second artificial neural network returns a plurality of projected scene contexts and their respective probabilities. Process 300 proceeds next to block 316, where an aggregate scene context is determined based on the first and second scene context. In various embodiments, the aggregate scene context is the scene context determined at block 208 in FIG. 2.

In some embodiments, the scene context from the first and second scene context with the highest determined probability is selected as the aggregated scene context. In other embodiments, both the first scene context and the second scene context are returned as the aggregate scene context. In yet other embodiments, where the first and second scene contexts include multiple scene contexts, the aggregate scene context may be the scene context that is common in both the first and second scene contexts. If there are multiple common scene contexts, then the common scene context that has a highest combined probability may be selected as the aggregate scene context.

After block 316, process 300 terminates or otherwise returns to a calling process to perform other actions. In some embodiments, some or all of blocks 302, 304, 306, and 308 may be preprocessed to generate the first artificial neural network, the second artificial neural network, or both, and some or all of blocks 310, 312, 314, and 316 may be employed in block 208 in FIG. 2 to generate the scene context based on an analysis of the video, audio, or both.

Figure 4:
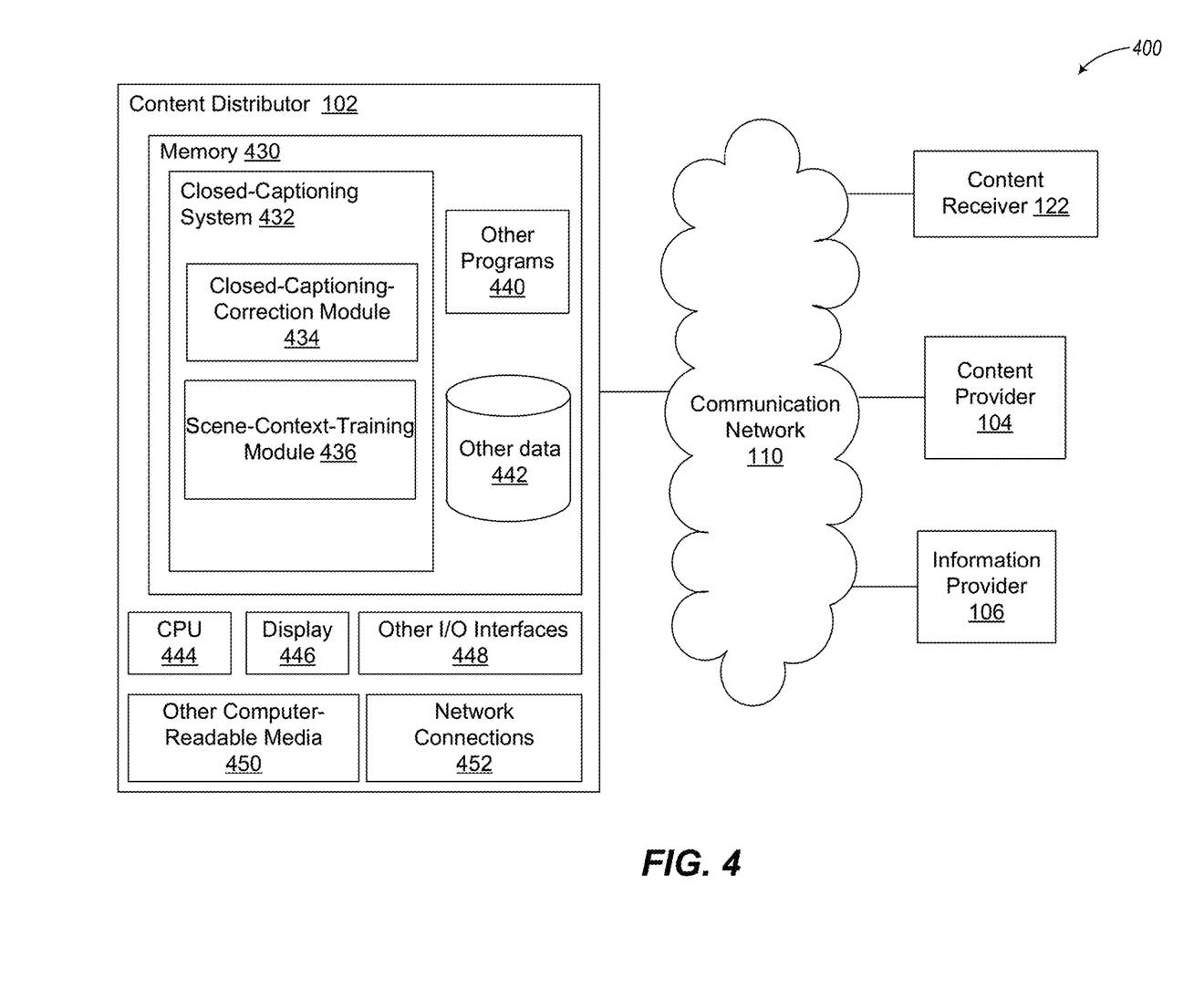
FIG. 4 shows a system diagram that describes one implementation of computing systems for implementing embodiments described herein.

FIG. 4 shows a system diagram that describes one implementation of computing systems for implementing embodiments described herein. System 400 includes content receiver 122, content distributor 102, content provider 104, and information provider 106.

Content distributor 102 receives content from content provider 104 and other information, such as closed captioning information (e.g., text, duration, timing) from information provider 106. In some embodiments, the closed captioning information is received from the content provider 104. The content distributor 102 analyzes the audio and video to determine a scene context of the content to determine where to position the closed captioning, to modify a duration in which the closed captioning is displayed, or to modify a timing of when the closed captioning is initially displayed, or some combination thereof, as described herein. One or more general-purpose or special-purpose computing systems may be used to implement content distributor 102. Accordingly, various embodiments described herein may be implemented in software, hardware, firmware, or in some combination thereof. Content distributor 102 may include memory 430, one or more central processing units (CPUs) 444, display interface 446, other I/O interfaces 448, other computer-readable media 450, and network connections 452.

Memory 430 may include one or more various types of non-volatile and/or volatile storage technologies. Examples of memory 430 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 430 may be utilized to store information, including computer-readable instructions that are utilized by CPU 444 to perform actions, including embodiments described herein.

Memory 430 may have stored thereon closed-captioning system 432, which includes closed-captioning-correction module 434 and scene-context-training module 436. The closed-captioning-correction module 434 may employ embodiments described herein to analyze the audio or video component of the content and the closed captioning to modify a timing or duration of the closed captioning or to determine a position in which to display the closed captioning. The scene-context-training module 436 may train one or more artificial neural networks (or other machine learning or artificial intelligence techniques) to output a scene context probability for a given piece of audio or video content. Memory 430 may also store other programs 440 and other data 442. For example, other data 442 may store the trained artificial neural networks.

Display interface 446 is configured to provide a graphical user interface to a user or administrator via a display device (e.g., an embodiment of display device 124 in FIG. 1). The graphical user interface may enable the user to label training content, modify the artificial neural networks, review closed captioning, etc.

Network connections 452 are configured to communicate with other computing devices, such as content receiver 122, content provider 104, and information provider 106 via communication network 110. Other I/O interfaces 448 may include a keyboard, audio interfaces, other video interfaces, or the like. Other computer-readable media 450 may include other types of stationary or removable computer-readable media, such as removable flash drives, external hard drives, or the like.

Content distributor 102, content provider 104, information provider 106, and content receiver 122 may communicate via communication network 110. Although not illustrated, the content receiver 122, the content provider 104, and the information provider 106 include processors, memory, network connections, and other computing components to perform actions as described herein.

In some embodiments, content distributor 102 includes one or more server computer devices to modify the closed captioning as described herein and provide the content and modified closed captioning to one or more content receivers 122. In other embodiments, the content receiver 122 may receive the unmodified closed captioning and content from the content distributor 102, and the content receiver 122 may perform embodiments described herein for modifying the closed captioning.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
obtaining content that incudes first video, first audio, and first closed captioning for a first scene in the content and that includes second video, second audio, and second closed captioning for a second scene in the content;
for the first scene in the content:
converting the first audio to text;
determining a first duration for the first closed captioning based on a comparison between the first closed captioning and the first audio text, wherein the first duration identifies a first amount of time to present the first closed captioning to a user;
determining a first scene context for the first scene based on analysis of the first video and the first audio;
determining a first display position of the first closed captioning based on the first scene context;
modifying the first duration of the first closed captioning to be shorter than a first speaking duration of a first person speaking during the first scene based on the first scene context; and
providing the first video and the first closed captioning to a content receiver for presentation to the user based on the first display position and the first modified duration; and
for the second scene in the content:
converting the second audio to text;
determining a second duration for the second closed captioning based on a comparison between the second closed captioning and the second audio text, wherein the second duration identifies a second amount of time to present the second closed captioning to the user;
determining a second scene context for the second scene based on analysis of the second video or the second audio, wherein the second scene context is different from the first scene context;
determining a second display position of the second closed captioning based on the second scene context;
modifying the second duration of the second closed captioning to be longer than a second speaking duration of a second person speaking during the second scene based on the second scene context; and
providing the second video and the second closed captioning to the content receiver for presentation to the user based on the second display position and the second modified duration.

2. The method of claim 1, further comprising:
determining a start time for a first plurality of words in the first closed captioning based on a timestamp associated with a first word of the first plurality of words;

performing a word comparison between the first audio text and the first plurality of words;

in response to a match between a second plurality of words in the first audio text and the first plurality of words in the first closed captioning, determining an audio start time of the second plurality of words in the first audio; and modifying the start time of the first plurality of words in the first closed captioning to match the audio start time of the second plurality of words in the first audio.

3. The method of claim 1, wherein determining the first duration for the first closed captioning includes:

determining a start time and an end time for a first plurality of words in the first closed captioning based on a timestamp associated with a first word of the first plurality of words;

performing a word comparison between the first audio text and a first plurality of words in the first closed captioning;

in response to a match between a second plurality of words in the first audio text and the first plurality of words in the first closed captioning, determining an audio duration of the second plurality of words in the first audio; and modifying the first duration of the first plurality of words in the first closed captioning to match the audio duration of the second plurality of words in the first audio.

4. The method of claim 1, wherein determining the first scene context and determining the display position includes:

identifying a background area of the first scene in the content based on changes in the background area over a plurality of frames being below a threshold value; and selecting the background area as a display position in which to present the first closed captioning.

5. The method of claim 1, wherein determining the first scene context and determining the first display position includes:

identifying the first person that is speaking in the first scene in the content based on mouth movement of the first person over a plurality of frames;

determining a location of the first person within the first scene; and selecting a display position in which to present the first closed captioning to be adjacent to the location of the first person speaking.

6. The method of claim 1, further comprising:

receiving a plurality of training audio clips each having a training scene context;

training an artificial neural network on the plurality of audio clips to generate classification probability parameters for each of the training scene context; and employing the trained artificial neural network on the first audio of the content to determine a probability of the first scene context.

7. The method of claim 1, further comprising:

receiving a plurality of training video clips each having a training scene context;

training an artificial neural network on the plurality of video clips to generate classification probability parameters for each of the training scene context; and employing the trained artificial neural network on the first video of the content to determine a probability of the first scene context.

8. The method of claim 1, further comprises:

wherein determining the first duration further includes:

determining a first time duration included with the first closed captioning indicating how long to display the first closed captioning; and determining a second time duration of the first audio text that corresponds to the first closed captioning wherein modifying the first duration further includes:

determining that the first audio text is in a first language and the first closed captioning is in a second language;

determining that the first time duration of the first closed captioning is different from the second time duration of the first audio text; and setting the modified first duration for the first closed captioning in the second language to be the second time duration of the first audio text in the first language.

9. A computing device, comprising:

a memory that stores computer instructions; and at least one processor that executes the computer instructions to:

receive content that incudes first video, first audio, and first closed captioning for a first scene in the content and that includes second video, second audio, and second closed captioning for a second scene in the content;

for the first scene in the content:

convert the first audio to text;

determine a first duration for the first closed captioning based on a comparison between the first closed captioning and the first audio text;

determine a first scene context for the first scene based on analysis of the first video or the first audio;

determine a first display position of the first closed captioning based on the first scene context;

modify the first duration of the first closed captioning to be shorter than a first speaking duration of a first person speaking during the first scene based on the first scene context; and provide the first video and the first closed captioning to a content receiver to be presented to a user based on the first display position and the first modified duration; and for the second scene in the content:

convert the second audio to text;

determine a second duration for the second closed captioning based on a comparison between the second closed captioning and the second audio text;

determine a second scene context for the second scene based on analysis of the second video or the second audio, wherein the second scene context is different from the first scene context;

determine a second display position of the second closed captioning based on the second scene context;

modify the second duration of the second closed captioning to be longer than a second speaking duration of a second person speaking during the second scene based on the second scene context; and provide the second video and the second closed captioning to the content receiver to be presented to the user based on the second display position and the second modified duration.

10. The computing device of claim 9, wherein the processor executes the computer instructions further to:

determine a start time for a first plurality of words in the second closed captioning based on a timestamp associated with a first word of the first plurality of words;
perform a word comparison between the second audio text and the plurality of words;
in response to a match between a second plurality of words in the second audio text and the first plurality of words in the second closed captioning, determine an audio start time of the second plurality of words in the second audio; and
set a start time of the first plurality of words in the second closed captioning to match the audio start time of the second plurality of words in the second audio.

11. The computing device of claim 9, wherein the processor determines the second duration for the second closed captioning by executing the computer instructions to:
determine a start time and an end time for a first plurality of words in the second closed captioning based on a timestamp associated with a first word of the first plurality of words;
perform a word comparison between the second audio text and a first plurality of words in the second closed captioning;
in response to a match between a second plurality of words in the second audio text and the first plurality of words in the second closed captioning, determine an audio duration of the second plurality of words in the second audio; and
modify the second duration of the first plurality of words in the second closed captioning to match the audio duration of the second plurality of words in the second audio.

12. The computing device of claim 9, wherein the processor determines the second scene context and determining the second display position by executing the computer instructions to:
identify a background area of the second scene in the content based on changes in the background area over a plurality of frames being below a threshold value; and
select the background area as the second display position in which to present the second closed captioning.

13. The computing device of claim 9, wherein the processor determines the second scene context and determining the second display position by executing the computer instructions to:
identify the second person that is speaking in the second scene in the content based on mouth movement of the second person over a plurality of frames;
determine a location of the second person within the second scene; and
select the second display position in which to present the second closed captioning to be adjacent to the location of the second person speaking.

14. The computing device of claim 9, wherein the processor executes the computer instructions further to:
receive a plurality of training audio clips each having a training scene context;
train an artificial neural network on the plurality of audio clips to generate classification probability parameters for each of the training scene context; and
employ the trained artificial neural network on the second audio of the content to determine a probability of the second scene context.

15. The computing device of claim 9, wherein the processor executes the computer instructions further to:
receive a plurality of training video clips each having a training scene context;
train an artificial neural network on the plurality of video clips to generate classification probability parameters for each of the training scene context; and
employ the trained artificial neural network on the second video of the content to determine a probability of the second scene context.

16. The computing device of claim 9, wherein the processor determines the second duration by executing the computing instructions to:
translate the second audio text from a first language to a second language of the second closed captioning;
determine an audio duration of the second audio text that corresponds to the second closed captioning based on a comparison of the translated audio text and the second closed captioning; and
set the second duration for the second closed captioning based on the audio duration.

17. A non-transitory computer-readable storage medium having stored thereon instructions that, when executed by a processor, cause the processor to perform actions, the actions comprising:
receiving content that incudes first video, first audio, and first closed captioning for a first scene in the content and that includes second video, second audio, and second closed captioning for a second scene in the content;
for the first scene in the content:
converting the first audio to text;
determining a first duration for the first closed captioning based on a comparison between the first closed captioning and the first audio text;
determining a first scene context for the first scene based on analysis of the first video or the first audio;
determining a first display position of the first closed captioning based on the first scene context;
modifying the first duration of the first closed captioning to be shorter than a first speaking duration of a first person speaking during the first scene based on the first scene context; and
providing the first video and the first closed captioning to a content receiver for display to the user based on the first display position and the first modified duration; and
for the second scene in the content:
converting the second audio to text;
determining a second duration for the second closed captioning based on a comparison between the second closed captioning and the second audio text;
determining a second scene context for the second scene based on analysis of the second video or the second audio, wherein the second scene context is different from the first scene context;
determining a second display position of the second closed captioning based on the second scene context;
modifying the second duration of the second closed captioning to be longer than a second speaking duration of a second person speaking during the second scene based on the second scene context; and
providing the second video and the second closed captioning to the content receiver for display to the user based on the second display position and the second modified duration.

18. The non-transitory computer-readable storage medium of claim 17, wherein execution of the instructions by the processor, cause the processor to perform further actions, the further actions comprising:

determining a start time and an end time for a first plurality of words in the first closed captioning based on a timestamp associated with a first word of the first plurality of words;

performing a word comparison between the first audio text and the first plurality of words;

in response to a match between a second plurality of words in the first audio text and the first plurality of words in the first closed captioning, determining an audio start time and an audio duration of the second plurality of words in the first audio; and modifying the start time and the end time of the first plurality of words in the first closed captioning based on the audio start time and the audio duration of the second plurality of words in the first audio.

19. The non-transitory computer-readable storage medium of claim 17, wherein determining the first scene context and determining the display position includes:

identifying a background area of the first scene in the content based on changes in the background area over a plurality of frames being below a threshold value; and selecting the background area as the display position in which to present the first closed captioning.

20. The non-transitory computer-readable storage medium of claim 17, wherein determining the first scene context and determining the first display position includes:

identifying the first person that is speaking in the first scene in the content based on mouth movement of the first person over a plurality of frames;

determining a location of the first person within the first scene; and selecting the first display position in which to present the first closed captioning to be adjacent to the location of the first person speaking.

\* \* \* \* \*